July 25, 1961 W. R. ABBOTT 2,994,075

COUNTER OUTPUT CIRCUIT

Filed Feb. 14, 1957

INVENTOR.
WILTON R. ABBOTT

BY Frederic B. Schramm

ATTORNEY 2,994,075
COUNTER OUTPUT CIRCUIT
Wilton R. Abbott, Whittier, Calif., assignor to North American Aviation, Inc.
Filed Feb. 14, 1957, Ser. No. 640,139
4 Claims. (Cl. 340—347)

This application relates to electronic circuits and concerns particularly a circuit providing analysis of input signals and providing indication of the concurrence of predetermined values and changes in values of said signals. More specifically the application relates to a device to receive analog signals from a plurality of transducers and provide digital output signals representing the quantity indicated or counted by said transducers.

In certain types of apparatus such as gages of the grid counting type transducers are provided which count impulses in order to produce an indication or measurement of a distance or a position. Such impulses may be produced in such a way so as to occur in accordance with a reflected binary or Gray type of cyclic code whereas position registers and computers for employing such indications or measurements are ordinarily operated in accordance with an arithmetical or conventional binary digital code. Apparatus has been proposed for converting such transducer signals received in cyclic code into conventional binary code in subsequent stages utilizing the signals in position registers.

In order to provide more compact and lighter apparatus, it is an object of the invention to accomplish translation and position registration in the same stages of the apparatus.

A more specific object of this invention is to provide apparatus for use with a grid counting type of gage to supply conventional binary signals to a computer and simultaneously actuate position registers.

Still another object of the invention is to provide an improved translator to convert from cyclic to conventional binary code.

Other and further objects, features and advantages of the invention will become apparent as the description proceeds.

In carrying out the invention in accordance with a preferred embodiment thereof in conjunction with reading heads for a gage, bistable electronic valve units responsive to reading heads arranged to provide push-pull outputs are connected to a translator consisting of a logical array of gates and diode elements. The translator comprises a plurality of "and" gates cascaded with "or" gates for interconnecting output terminals of the bistable valve units with a position register and digit output terminals for supplying the most significant digits and least significant digits of a two bit binary code.

Figure 1:
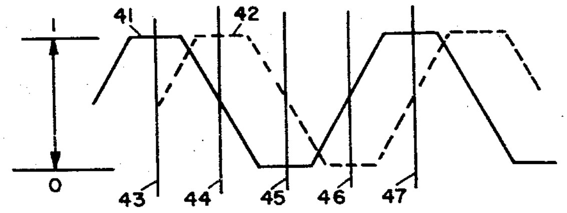
Figure 2:
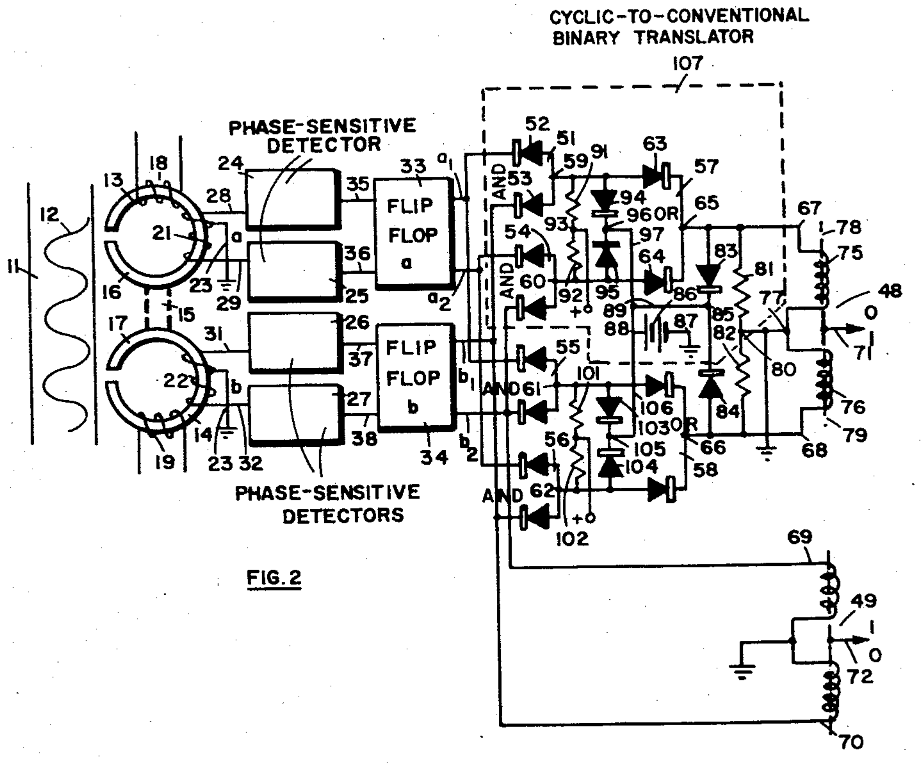

A better understanding of the invention will be afforded by the following detailed description considered in conjunction with the accompanying drawing in which FIG. 1 is a graph illustrating relationship between position of a gage reading head and output signals from the head;

FIG. 2 is a circuit diagram schematically representing the arrangement of reading heads, a translator and a position register connected thereto.

As illustrated in FIG. 2, the apparatus may be utilized for recording distances along a ferrous bar 11 magnetized transversely along its length in such a manner that polarity and strength of magnetization vary and reverse cyclically in accordance with a sine wave as represented symbolically by a wave form 12. A pair of reading heads 13 and 14 are so mounted on a movable carriage 15 that they are displaced from each other an odd number of quarter wave lengths of the magnetic grid or sinusoidal pattern 12 formed in the bar 11. Consequently signals produced by heads 13 and 14 will be in quadrature relation to each other.

The relationship is illustrated in FIG. 1 where the wave form of output signal from the head 13 is represented by a full line curve 41 and the output from the head 14 is represented by dashed line curve 42.

Although the invention is not limited thereto, the heads 13 and 14 may be arranged to produce an envelope output wave constituting modulations of a carrier frequency or a pulsed clock frequency wave. A carrier frequency impressed upon cores 16 and 17 by exciting windings 18 and 19 connected to a carrier frequency source (not shown) will react with the magnetic wave form 12 in the bar 11 to induce magnetic flux pulses in cores 16 and 17. For detecting such pulses, windings 21 and 22 are mounted upon cores 16 and 17, respectively. In order to enable a push-pull type of output to be generated in the coils 21 and 22, they are grounded at the center by ground connections 23. Phase sensitive detectors 24, 25, 26 and 27 incorporating rectifier means for suppressing positive pulses are provided so that there are two pairs of detectors, one pair 24 and 25 having input connections 28 and 29 from opposite ends of the coil 21 on the core 16, whereas the other pair of phase sensitive detectors 26 and 27 have input connections 31 and 32 from opposite ends of the coil 22. The phase sensitive detectors 24, 25, 26 and 27 operate to pass a signal to properly control the flip-flop circuits 33 and 34, to be described hereafter. It will be appreciated that the carrier frequency inputs received through exciting windings 18 and 19 will cause alternating current outputs to be delivered to the phase-sensitive detector circuits, with their amplitudes modulated in accordance with the pattern 12. As the varying pattern 12 passes the gaps in the cores 16 and 17, the reluctance of the magnetic path of each core will change, and these variations will be reflected in the outputs of the phase-sensitive detectors. Since the polarities of the modulated output from the cores will change in accordance with the portions of the varying magnetization on the tape, here shown magnetized in a sinusoidal curve, the output through leads 28 and 29 from core 16 and from 31 and 32 associated with core 17 will alternately shift in phase as the magnetic recording on the tape varies. Such phase shift may be readily visualized by the addition of an A.-C. vector (representing excitation) and a varying D.-C. vector (representing the recorded magnetization on the tape). With each phase shift there occurs a change of polarity in the output of the detectors and there will be a corresponding change in the signal initiated by each of the associated flip-flops.

Bistable valve units 33 and 34 such as multivibrator vacuum tube circuits of the Eccles-Jordan type are provided, e.g. as illustrated on page 4 of the catalog of Eeco Production Company No. 81,554. Unit 33 has input terminals 35 and 36 connected to output terminals of phase sensitive detectors 24 and 25, respectively. Likewise bistable valve unit 34 has input terminals 37 and 38 connected to output terminals of phase sensitive detectors 26 and 27, respectively. Bistable valve unit 33 has output terminals $a_1$ and $a_2$, whereas bistable valve unit 34 has output terminals $b_1$ and $b_2$. One state of the bistable valve unit 33 is arbitrarily the zero state and the other is the "one" state. The "one" state, for example, is that in which potential of the terminal $a_1$ is high and that of the terminal $a_2$ is low, the "zero" state being the opposite condition of the bistable valve unit 33. Similarly, arbitrarily for bistable valve unit 34, the "one" state represents that at which the potential of $b_1$ is high compared with terminal $b_2$.

Referring to FIG. 2, as carriage 15 is moved along the bar 11 the outputs from the heads 13 and 14 will progressively vary as illustrated. The output from the head 13 at the position represented by the abscissa 43, as shown by the heavy line 41 becomes one. As the carriage 15 is moved along bar 11, as represented by dashed line 42, the output of the head 14 changes to the one condition at the instant the head 14 passes into the space represented as between abscissae 43 and 44. No other change of state occurs at this time, since the output of head 13 continues to be one. At position 44 the output of the head 13 changes to the zero condition, whereas at position 45 the output of the head 14 changes to the zero condition. It is observed, therefore, that signal outputs from the heads are in the reflected binary or Gray form of cyclic Gray code with only one digit changing at a time and never an instance of two digits changing at a time. This result is tabulated in Table I as follows. The first column represents the head position, second and third columns represent the polarity of the output from the heads 13 and 14, respectively, and the remaining four columns represent the polarities of signals $a_1$, $a_2$, $b_1$, $b_2$, respectively, in the Gray or reflected binary form of cyclic digital code, one representing positive polarity, zero representing negative polarity.

*Table 1*

| Interval | Head *a* | Head *b* | $a_1$ | $a_2$ | $b_1$ | $b_2$ |
|---|---|---|---|---|---|---|
| 43–44 | 1 | 1 | 1 | 0 | 1 | 0 |
| 44–45 | 0 | 1 | 0 | 1 | 1 | 0 |
| 45–46 | 0 | 0 | 0 | 1 | 0 | 1 |
| 46–47 | 1 | 0 | 1 | 0 | 0 | 1 |

In order to convert the reflected binary code to arithmetic binary code signals and actuate position registers 48 and 49 indicating in two bit code, the logical circuit shown in FIG. 2 is provided.

This comprises an "and" gate 51 represented as taking the form of pair of diodes 52 and 53 connected to bistable valve unit terminals $a_1$ and $b_1$, respectively, together with similar "and" gates 54, 55, 56 and a pair of "or" gates 57 and 58. The "and" gate 54 is connected between terminals $a_2$ and $b_2$, the "and" gate 55 is connected between terminals $a_1$ and $b_2$, and "and" gate 56 is connected between terminals $a_2$ and $b_1$. The "and" gates 51, 54, 55 and 56 have output terminals 59, 60, 61 and 62, respectively, the "or" gates 57 and 58 in the form illustrated also comprise diodes. For example, the "or" gate 57 comprises a pair of diodes 63 and 64 connected to output terminals 59 and 60 of "and" gates 51 and 54, respectively. The "or" gate 57 has output terminal 65.

Likewise, "or" gate 58 is connected between output terminals 61 and 62 of "and" gates 55 and 56 and has output terminal 66.

"Or" gate output terminals 65 and 66 are in turn connected to translator output terminals 67 and 68, respectively, which arbitrarily are designated as the zero and one terminal, respectively, for the register 48. Terminals 67 and 68 and register 48 are for the least significant digits, being energized from the bistable valve unit output terminals $a_1$, $a_2$, $b_1$, $b_2$ through the logical circuit comprising "or" gates 57 and 58 cascaded as shown with "and" gates 51, 54, 55 and 56. One pair of the stable valve unit output terminals, for example, $b_1$ and $b_2$, are connected directly to register terminals 69 and 70 of the register 49 which is the most significant digit register, the terminal 69 being the one digit terminal, 70 the zero digit terminal.

The registers may be of any desired form. For the sake of illustration they are shown as of the plunger-actuating coil type with indicator 71 and 72 movable between zero and one indicators of the register dials. In the case of register 48, coils 75 and 76 are connected in a series between the terminals 67 and 68 having a junction terminal 77 which is grounded. Within coils 75 and 76 are plungers or armatures 78 and 79 biased by means (not shown) to a center position so that when either coil 75 or 76 is energized, the pointer 71 is attracted to either zero or one position to provide position registration of the least significant digit of a two bit code. In like manner register 49 provides indications of the more significant digit of the two bit code.

Preferably for establishing a reference with respect to ground potential, the terminals 67 and 68 are connected to the ends of series pair of resistors 81 and 82 having a junction terminal 80 which is grounded. Moreover, unilateral conducting devices such as diodes 83 and 84 are also connected between terminals 67 and 68 being connected in series opposition and having a junction terminal 85. A bias voltage source 86 is provided having a grounded negative terminal 87, and a positive terminal 88 connected by a conductor 89 to junction of diodes 83 and 84.

Moreover, output terminals 59 and 60 of "and" gates 51 and 54 are also connected together by a series pair of resistors 91 and 92 having a junction terminal 93 connected to a point of positive potential, which may be the terminal 85. In addition unilateral devices such as diodes 94 and 95 are connected in series opposition between terminals 59 and 60 with a junction terminal 96 connected by means of conductor 97 to the positive terminal 88 of bias source 86. In like manner the output terminals 61 and 62 of "and" gates 55 and 56 are connected to a center grounded resistance pair 101 and 102, with a pair of diodes 103 and 104 with junction terminal 105 connected to the positive terminal 88 of bias voltage source 86 through a conductor 106.

If positive indication of zero is not required, the portion of the circuit enclosed within the dashed line rectangle 107 may be omitted.

It will be understood that the apparatus illustrated may be utilized in conjunction with production of more than two bits, the portion of the circuit shown constituting the first two stages of the position register as well as a translator from cyclic to conventional binary code. As illustrated, the heads 13 and 14 provide four outputs feeding into phase sensitive detectors resulting in pulse outputs. Thus in the vicinity of the null for one of the heads one of the output leads for the other head carries negative pulses at carrier frequency and the other carries nothing (positive pulses are suppressed by rectifiers in the demodulators). Before reaching its null the other head has one lead carrying negative pulses. The negative pulses transfer to the other lead as the null is crossed. These leads are connected to the inputs of the two bistable valve units. The state of each bistable valve unit is then determined by the lead on which pulses appear. As the pulses transfer from one input lead to another as a result of crossing the null, one of the bistable valve units at a time changes state. It is not affected by subsequent pulses on the same lead unless in the meantime pulses have appeared on other lead. This is illustrated by FIG. 1. During the interval between positions 43 and 44, both bistable valve units indicate one. During th next interval from positions 44 to 45, the unit 13 reads zero whereas the unit 14 reads one. During the next interval between positions 45 and 46 both read zero and during fourth interval between positions 46 and 47 bistable valve unit 13 reads one and unit 14 reads zero. This corresponds to the tabulation of Table I.

It will be understood that in bistable valve units the one digit indicates one of the output levels and the digit zero indicates th other. The actual levels are arbitrary. It is also assumed that bistable valve unit 34 responsive to head 14 is the one which yields the most significant digit and that the unit 33 yields the least significant digit of a number. Accordingly, as the head carriage 15 moves through successive positions, the output changes from 11 to 10 to 00 to 01 if output is taken from leads $a_1$ and $b_1$. But output changes from 00 to 01 to 11 to 10 if output is taken from terminals $a_2$ and $b_2$. In either case the count is in the cyclic Gray code. The two pairs count in the same direction being one half-cycle out of phase.

If it is desired to count in the other direction terminal $a_1$ may be paired with terminal $b_2$ or $a_2$ with $b_1$ by interchange of outputs of one of the bistable valve units.

Thus it is evident that the bistable valve terminal output terminals feed a circuit for translating from Gray to conventional binary code and the output of the translator will give the same indication as would a two stage binary counter fed by count up and count down pulses derived from the bistable valve units. Since deriving count up and count down pulses would take essentially as much equipment as the translator illustrated, an improved compact counter and position register circuit has been provided. It will be observed that the outputs from a bistable valve unit cannot be used directly in the least significant stage of a Gray code counter.

The translator illustrated represents a mechanization of the following propositions:

$0_a$ will occur if and only if ($a_2$ and $b_2$) or ($a_1$ and $b_1$) occurs $1_a$ will occur if and only if ($a_1$ and $b_2$) or ($a_2$ and $b_1$) occurs $0_b$ will occur if and only if $b_2$ occurs $1_b$ will occur if and only if $b_1$ occurs.

It is obvious that changes in polarity of electromotive force and reversal of diodes make it possible to count with alternative zero and one conventions.

It will be understood that it may be desirable to provide cathode followers in the outputs of the bistable valve units but such elements have been omitted from the drawing for simplicity. Likewise cathode followers should be interposed in the output connections to the terminals 67, 68, 69 and 70.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A binary coding system comprising in combination a pair of signal pickup elements spaced an odd number of quarter wave lengths apart along an indicating member periodically indexed to affect said pickup elements arranged to receive signals in quadrature therefrom, each of said elements having a center grounded pickup coil, a pair of phase-sensitive detectors connected to the first pickup coil, a second pair of phase-sensitive detectors connected to the second pickup coil, a bistable electronic valve unit having input terminals connected to the first pair of phase detectors and having a pair of output terminals serving as first and second logic supply terminals, a second bistable electronic valve unit having input terminals connected to the second pair of phase-sensitive detectors and having a pair of output terminals serving as third and fourth logic supply terminals, a pair of output terminals for the most significant ones and zeros connected to the third and fourth logic supply terminals, respectively, a pair of output terminals for the least significant zeros and ones, respectively, an "and" gate having input connections from the first and third logic terminals and having output terminals, a second "and" gate having input connections from the second and fourth logic terminals and having an output terminal, an "or" gate having input connections from the output terminals from first and second "and" gates and having an output terminal connected to least significant zero terminal, a third "and" gate having input connections from the first and fourth logic terminals and having an output terminal, a fourth "and" gate having input connections from the second and third logic terminals and having an output terminal, a second "or" gate having input connections from the output terminals of the third and fourth "and" gates and having an output connection to the least significant one terminal said logic elements being adapted to supply a positive indication of zero output.

2. Apparatus as in claim 1 in which a resistor having a grounded center terminal is connected between least significant zero and one terminal.

3. Apparatus as in claim 1 wherein a resistor having a grounded center terminal is connected between the last significant zero and one terminal, a pair of rectifier means having a junction terminal are connected in a series opposition between the output terminals of the first and second "and" gates with a junction terminal, a pair of diodes having a junction terminal are connected in series opposition between the output terminals of the third and fourth "and" gates, a pair of rectifier means are connected between the output terminals of the "or" gates, and a bias voltage source is connected between ground and junction terminals of said rectifier means.

4. A binary coding system comprising in combination a pair of signal pickup elements spaced an odd number of quarter wave lengths apart along an indicating member periodically indexed to affect said pickup elements and arranged to receive signals in quadrature therefrom, each of said elements having a center-grounded pickup coil; a pair of phase-sensitive detectors connected to the first pickup coil; a second pair of phase-sensitive detectors connected to the second pickup coil; means for suppressing positive pulses in the outputs of said first and second phase-sensitive detectors; a bistable electronic valve unit having input terminals connected to the first pair of said phase detectors and having a pair of output terminals serving as first and second logic supply terminals; a second bistable electronic valve unit having input terminals connected to the second pair of phase-sensitive detectors and having a pair of output terminals serving as third and fourth logic supply terminals; a pair of output terminals for the most significant ones and zeros connected to the third and fourth logic supply terminals respectively; a pair of output terminals for the least significant zeros and ones respectively; an "and" gate having input connections from the first and third logic terminals and having output terminals; a second "and" gate having input connections from the second and fourth logic terminals and having an output terminal; an "or" gate having input connections from the output terminals of said first and second "and" gates and having an output terminal connected to the least significant zero terminal; a third "and" gate having input connections from the first and fourth logic terminals and having an output terminal; a fourth "and" gate having input connections from the second and third logic terminals and having an output terminal; a second "or" gate having input connections from the output terminals of the said third and fourth "and" gates and having an output connection to the least significant one terminal, whereby analog signals from said pickup elements may be converted to reflected binary signals at the output of said bistable electronic valve units and converted again to conventional binary signals with positive indications of zero at said most significant and least significant one and zero terminals.

References Cited in the file of this patent

UNITED STATES PATENTS

| | | |
|---|---|---|
| 2,679,644 | Lippel | May 25, 1954 |
| 2,685,082 | Beman | July 27, 1954 |
| 2,791,764 | Gray, Jr. et al. | May 7, 1957 |
| 2,797,401 | Green et al. | June 25, 1957 |
| 2,798,667 | Spielberg et al. | July 9, 1957 |
| 2,804,605 | De Turk | Aug. 27, 1957 |